(12) United States Patent
Jones et al.

(10) Patent No.: US 6,449,286 B1
(45) Date of Patent: Sep. 10, 2002

(54) R2 MULTI-FREQUENCY COMPELLED SIGNALLING USING A DSP ON A NETWORK TERMINATION CARD

(75) Inventors: Barry W. Jones, Hoffman Estates; Daniel F. Baker, Rolling Meadows, both of IL (US)

(73) Assignee: Rockwell Semiconductor Systems, Inc., Newport Beach, CA (US)

( * ) Notice: Subject to any disclaimer, the term of this patent is extended or adjusted under 35 U.S.C. 154(b) by 0 days.

(21) Appl. No.: 09/151,386

(22) Filed: Sep. 10, 1998

(51) Int. Cl.[7] .............................. H04J 3/16; H04J 3/12; H04L 12/50; H04M 11/00
(52) U.S. Cl. .................. 370/467; 370/384; 370/525; 379/93.31; 379/93.15
(58) Field of Search ................. 370/241, 250, 370/535, 386, 524, 522–523, 525, 526, 419, 260, 286, 289, 290, 384, 352–356; 379/5, 198, 6, 22, 28, 26, 30, 219, 229, 93.05

(56) References Cited

U.S. PATENT DOCUMENTS

| | | | |
|---|---|---|---|
| 5,140,611 A | 8/1992 | Jones et al. ................ 375/7 |
| 5,268,903 A * | 12/1993 | Jones et al. ............. 370/110.1 |
| 5,335,269 A | 8/1994 | Steinlicht ................. 379/266 |
| 5,469,504 A | 11/1995 | Blaha ..................... 379/265 |
| 5,822,420 A * | 10/1998 | Bolon et al. ............... 370/198 |
| 5,835,565 A * | 11/1998 | Smith et al. ................ 379/5 |
| 5,983,282 A * | 11/1999 | Yucebay ................... 709/249 |
| 5,991,292 A * | 11/1999 | Focsaneanu et al. ........ 370/419 |
| 6,049,694 A * | 4/2000 | Kassatly ................... 370/260 |
| 6,072,794 A * | 6/2000 | Kang ...................... 370/352 |
| 6,144,703 A * | 11/2000 | Bae ....................... 375/242 |
| 6,205,208 B1 * | 3/2001 | Detlefsen et al. ........ 379/93.05 |
| 6,233,237 B1 * | 5/2001 | Yucebay et al. ............ 370/384 |
| 6,289,097 B1 * | 9/2001 | Gregory et al. ............ 370/352 |

* cited by examiner

*Primary Examiner*—Ajit Patel
*Assistant Examiner*—Hanh Nguyen
(74) *Attorney, Agent, or Firm*—Welsh & Katz, Ltd.

(57) ABSTRACT

A method and apparatus are provided for processing signals received on a R2 multifrequency compelled signalling subscriber channel within a telephone switch. The method includes the steps of disposing a digital signal processor within the telephone switch between an inbound path of the R2 multifrequency compelled signal subscriber channel and a controlling processor of the telephone switch and detecting an R2 multifrequency compelled signalling control transmission by the digital signal processor on the inbound path. The method further includes the steps of responding to the control transmission by the digital signal processor transmitting an acknowledgement on an outbound path of the subscriber channel and transferring a symbolic representation of the control transmission to the controlling processor of the switch.

33 Claims, 1 Drawing Sheet

R2 MULTI-FREQUENCY COMPELLED SIGNALLING USING A DSP ON A NETWORK TERMINATION CARD

FIELD OF THE INVENTION

The field of the invention relates to telephone systems and more particularly to the processing of call control signals at switching offices of telephone systems.

BACKGROUND OF THE INVENTION

The use of R2 multifrequency compelled signalling (R2 MFC) in telephone systems is known. R2 MFC is an in-band signalling protocol that uses combinations of frequencies to convey information. While it is similar to dual tone multifrequency (DTMF) in that combinations of frequencies are used to convey information, R2 MFC provides the additional functionality of being adapted for use in inter-switch signalling.

More specifically, DTMF is typically used to convey dialed number information from a subscriber telephone to a local central office (CO). As such, DTMF is typically limited to the conveyance of digits 0 to 9, # and *. If a digit is not received by the CO, or is received incorrectly, the result is a wrong number or the familiar audio message "this call cannot be completed as dialed, please try your call again".

In contrast, R2 MFC is used between a CO and a local switching center. Further, R2 MFC, by necessity, is an interactive protocol.

For example, in placing a call from a CO to a switching center, the CO first seizes a trunk connection and forwards a make call request in the form of a R2 MFC frequency combination (e.g., F1+F2) over the seized connection. The CO then waits for a response. If the CO does not receive a response within a predetermined period, the request is repeated.

The switching center upon receiving the make call request (e.g., by detecting the R2 MFC combination of F1+F2) responds by acknowledging the make call request (e.g., by responding with a handshaking signal). The acknowledgement is returned to the CO and may be recognized at the CO by detection of a second frequency combination (e.g., F3+F4).

The CO may respond to the acknowledgement by forwarding a set of dialed digits. Again the CO may wait for a response and, if failing to get an acknowledgement, may again forward the set of dialed digits.

The switch upon receiving a set of dialed digits may respond with an acknowledgement. The acknowledgement may be in the form of another tone combination (e.g., F5+F6).

After receipt of the acknowledgment for the dialed digits, the CO again enters a wait state for either connection of the caller to the called number or for return of a busy signal. When a call is connected, the switch may send a connect combination (e.g., F7+F8). A busy signal may be indicated with a busy signal combination (e.g., F9+F10).

When the called party hangs up at the end of the call, the switch may return a called party termination signal combination (e.g., F11+F12). Similarly, where the caller hangs up first, the CO may send a calling party termination combination signal (e.g., F13+F14).

While the R2 MFC format works relatively well, it is also relatively slow. Further, other protocols have been developed (e.g., ISDN) for intra-switch communication which are regarded as much more efficient and considerably more flexible.

One difficulty with implementing newer switching protocols, however, lies in the expense of converting whole systems to the faster protocols. Further, converting less than all of the system provides inherent communication problems where one part of a system operates on one protocol and another part operates under another.

One solution to the problem of different parts of a system using different intra-switch communication protocols has been solved by the introduction of the Acculab Groomer. The Acculab Groomer is a translator box which is interposed in trunk lines between switches. On one side of the Acculab Groomer, communications are accomplished using R2 MFC. On the other side, the U.K. version of ISDN (i.e., DPNSS) is used.

While the Acculab Groomer is effective, it is also expensive to use and is inflexible in adapting to changing trunk line requirements or to a mix of trunk-line protocols. Consequently, a need exists for a means of adapting trunk interfaces to other formats without the necessity of translator boxes.

SUMMARY OF THE INVENTION

A method and apparatus are provided for processing signals received on a R2 multifrequency compelled signalling subscriber channel within a telephone switch. The method includes the steps of disposing a digital signal processor within the telephone switch between an inbound path of the R2 multifrequency compelled signal subscriber channel and a controlling processor of the telephone switch and detecting an R2 multifrequency compelled signalling control transmission by the digital signal processor on the inbound path. The method further includes the steps of responding to the control transmission by the digital signal processor transmitting an acknowledgement on an outbound path of the subscriber channel and transferring a symbolic representation of the control transmission to the controlling processor of the switch.

DETAILED DESCRIPTION OF THE PREFERRED EMBODIMENT

Figure 1:
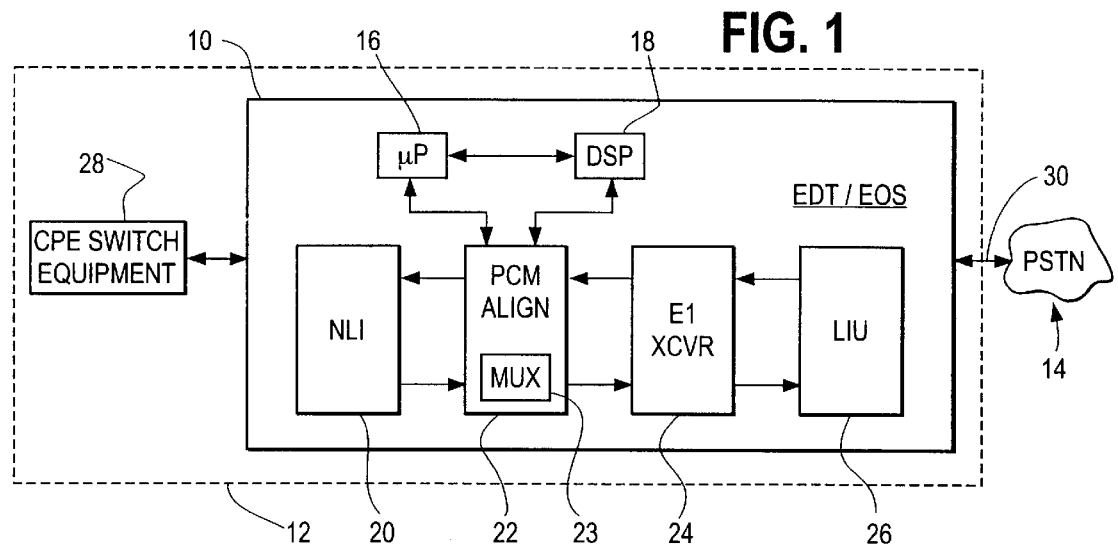
FIG. 1 is a block diagram of a telephone system showing a trunk interface system in accordance with an embodiment of the invention.

FIG. 1 is a block diagram of a trunk interface system (EDT/EOS) 10 in accordance with an embodiment of the invention and shown in a context of use. As shown, the trunk interface system 10 may be located within a user's customer premises equipment (CPE) (e.g., a private branch exchange (PBX), automatic call distributor (ACD), etc.) 12 and function to provide an interface between customer premises equipment (CPE) 12 and a public switched telephone network (PSTN) 14, through an interconnecting trunk line(s) 30.

For purposes of the invention, it may be assumed that the PSTN 14 is a system using R2 MFC as an intra-switch signaling protocol. The interconnecting trunk(s) 30 may be assumed to be an El type trunk, each providing 32 subscriber channels.

The CPE 12 may receive calls on subscriber channels from the PSTN 14 and may function to route the calls to specific destinations within the CPE 12 (e.g., to an agent or group of agents, a predetermined telephone unit (using direct-inward-dialing (DID) techniques), etc.) based upon call destination information delivered with the call. The destination information may be specified in call setup messages received in conjunction with the call from the PSTN 14. Alternatively, the CPE 12 may function to setup and deliver calls to predetermined call destinations within the PSTN 14 based upon specific call setup messages transferred from the CPE 12 to the PSTN 14.

The trunk interface unit 10 may be configured and generally function in a manner consistent with any of a number of known standards (e.g., European Digital Trunking (EDT), European Digital Systems (EDS), etc.), with a few exceptions. For example, on an inbound subscriber signal path, a digital signal processor (DSP) 18 may be provided to detect and respond to R2 MFC protocols where detected. A multiplexer (MUX) 23 may be provided in an outbound subscriber signal path to route R2 MFC signals, generated by the DSP 18, to the PSTN 14.

Within the trunk interface unit 10, a line interface unit (LIU) 26 is provided to match the characteristics of the trunk line 30 with the characteristics of the trunk transceiver 24. The transceiver 24, in turn, drives the trunk connection (i.e., transceives the 32 channel pulse code modulated (PCM), time division multiplexed (TDM) signals) through the LIU 26. A PCM align section 22 is provided for purposes of synchronizing the CPE 12 to the PSTN 14. Finally, a network link interface 20 is provided to match the protocol of the trunk interface unit 10 with a proprietary protocol that may be used by the remainder of the CPE 12.

It is to be understood that only some or all of the trunk connections 30 may operate under a R2 MFC format. For example, all of the trunks 30 may transceive data under a PCM format, while only some operate under a R2 MFC format. The channels operating under a R2 MFC format may be sampled at a source within the PSTN 14 and be converted into PCM. The DSP 18, in turn, may detect the various frequency combinations of R2 MFC through processing of the PCM data on the various subscriber channels to detect the frequency combinations of the individual R2 MFC commands.

While for purposes of this description and for simplicity, it will be assumed that trunks 30 operate under a digital format, it is also to be understood that the trunk interface 10 may also be configured to operate using analog trunks 30. To configure the trunk interface 10 for use with analog subscriber channels would require the simple addition of an analog to digital (A/D) converter between the PCM aligner 22 and DSP 18.

Figure 2:
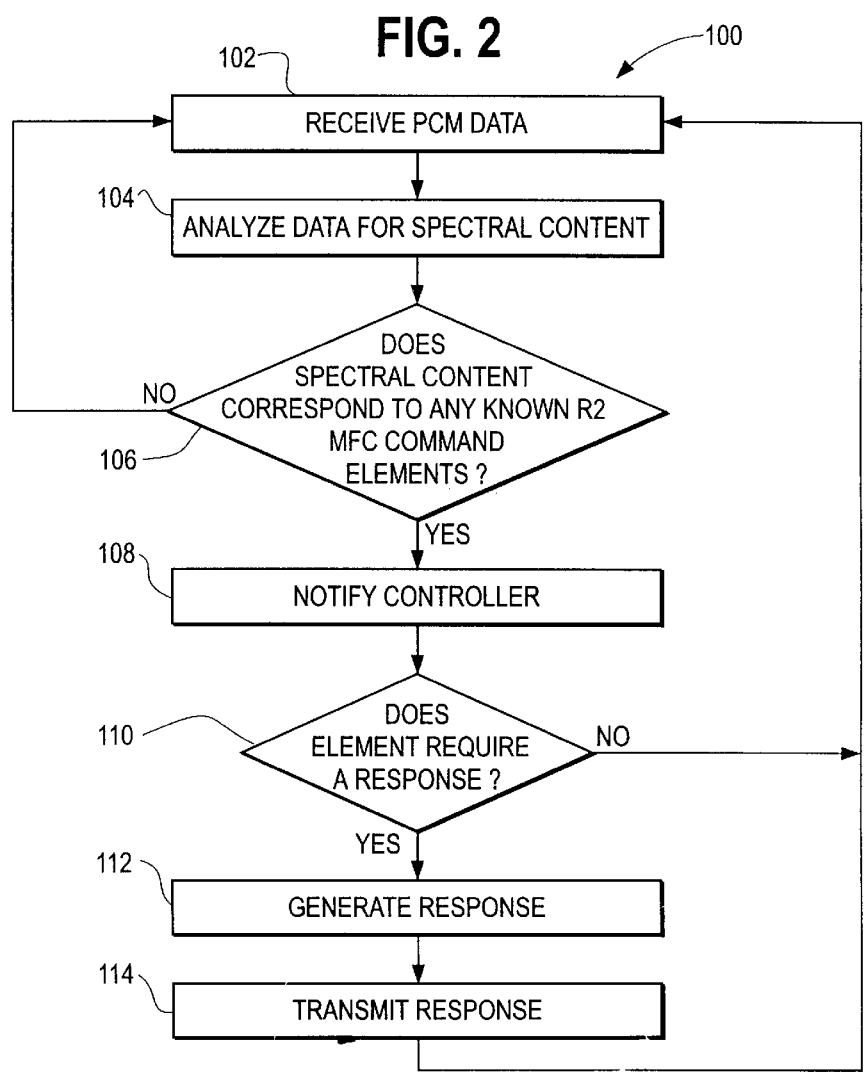
FIG. 2 is a flow chart of call processing of the trunk interface system of FIG. 1.

FIG. 2 is a block diagram of a flow chart 100 of processing R2 MFC information under an illustrated embodiment of the invention. Reference shall be made to FIG. 2 as appropriate to an understanding of the invention.

In operation, the DSP 18 functions to monitor incoming data on one or more incoming channels of the trunk 30. As the data of each monitored channel is received 102, it may stored in a memory (not shown) of the DSP 18 or processed directly. PCM data may be processed 104 within the DSP 18 by an appropriate frequency analysis software (e.g., spectral analysis software by D2 Technologies) to detect and analyze the spectral content of the PCM data.

The spectral analysis software may operate in any number of formats. For instance, the software may receive a rolling time frame of PCM data and perform a fast Fourier transform on the data to detect spectral ranges of signal activity. The detected ranges may be compared to a threshold value to narrow the spectral ranges and to eliminate random noise.

Once the spectral ranges are narrowed, they may be compared 106 to a set of known R2 MFC command elements (e.g., frequencies F1, F2, F3, etc.). Once known R2 command elements are identified, the elements may be combined by comparing the identified elements with the list of known combinations of elements (e.g.; F1+F2, F3+F4, etc.) which represent known commands or which have predefined alpha-numeric meaning. The command or alpha-numeric characters may be determined (i.e., decoded) by reference to a lookup table (not shown) within the memory of the DSP 18. From the lookup table, the DSP 18 may retrieve a symbolic representation of the characters (e.g., control or alpha-numeric) which may be readily recognized by the CPE 28.

Once the meaning of the R2 MFC transmission have been decoded, the DSP 18 transfers 108 the decoded information as a channel associated control message to the processor 16 along with an identifier of channel of the trunk 30 providing the information. Upon receiving the message, the processor 16 may store the message in a call record for later execution depending on the context or immediately take some action based upon the content of the message.

For example, where the decoded R2 MFC is a make call message, the processor 16 may create a call record in memory of the processor 16 until the call record is complete (i.e., a complete set of dialed digits has been received). When the call record is complete, the processor 16 may forward the call record to the CPE switch 28 for processing.

In addition, the DSP 18 may also return a transition notification to the processor 16. The transition notification may be used to determine the advent of a R2 MFC tone or tones and the end of such tones. The transition notification may be advantageously used to detect multiple R2 MFC tones (e.g., a "2" follows by another "2", a "3" followed by another "3", etc.).

Upon notifying the controller 16 of the content of the decoded message, the DSP 18 also compares 110 the decoded message with a second lookup table to determine whether the message requires a handshaking response. Where the DSP 18 identifies a match, the DSP 18 checks to see if a response is stored with the message. Where a response is stored with the message, the DSP 18 may retrieve a response from the lookup table. The response may be a combination of frequencies (e.g., FA+FB), or it may be the address of a subroutine which generates the combination of frequencies indicative of a particular F2 MFC message.

As is well known in the art, a frequency or combination of frequencies may be represented as a pulse sequence. A subroutine may be called for each generated frequency or combination of frequencies or the pulse sequence of each combination may be stored in the memory of the DSP 18 directly.

Upon determining the need to send a response, the DSP 18 may send an access request to the processor 16 identifying the channel over which the response is to be sent. The processor 16 in turn may program the MUX 23 to accept the response from the DSP 18 and forward the response on the identified channel to the PSTN 14.

When call control information is to be transmitted, outbound to the PSTN 14, the R2 MFC format (e.g., a make call message from the CPE 12 to the PSTN 14) a similar procedure may be used. The processor 16 monitors for control transmissions associated with the R2 MFC subscriber channels. Control transmissions of one or more alpha-numeric characters for a particular channel may be forwarded to the processor as packets with identifiers of the particular channel or the control transmissions may be forwarded to the processor as channel associated signalling (CAS) which identifies a particular channel by the context of its transmission.

In either case, the processor 16 by reference to the channel identifier and a lookup table (not shown) in its memory determines whether a particular control transmission is related to a R2 MFC subscriber channel. If it is, then the processor 16 forwards the transmission to the DSP 18 along with an identifier of the channel.

Within the DSP 18, the control transmission is converted to a R2 MFC by reference to a lookup table. As above, the alpha-numeric characters of the control transmission are located in the lookup table and where a R2 MFC response is present, it is retrieved. Upon receiving the response, the DSP 18 again sends an access request to the processor 16, including the channel identifier. Again, the processor 16 programs the MUX 23 to accept a transmission from the DSP 18 and couple the transmission to the requested outbound subscriber channel. The R2 MFC equivalent of the control transmission is, thereby, forwarded to the PSTN 14.

By way of example, a subscriber (not shown) of the PSTN 14 may place a call to the CPE 12 by dialing a telephone number of the CPE 12. To complete the call to the CPE 12, the PSTN 14 sends a R2 MFC call setup instruction over a subscriber channel of the trunk 30 to the CPE 12.

The DSP 18 monitoring the channel detects and decodes the R2 MFC setup message. Upon detecting and decoding the R2 MFC message, the DSP 18 forwards the message to the processor 16 along with a channel identifier. The DSP 18 also checks in the lookup table to determine whether a response is necessary.

Where a response is necessary, the DSP 18 forwards the channel access request to the processor 16 along with the channel identifier. In response, the processor 16 activates the MUX 23 and a R2 MFC response to the call setup message is returned to the PSTN 14 on the subscriber channel.

Upon receipt of the R2 MFC response to the channel setup request, the PSTN 14 forwards R2 MFC dialed digits. The DSP 18 monitoring the channel detects the digits and forwards the digits to the processor 16. If a R2 MFC response message were stored with any of the detected digits, the DSP 18 would return the message. Otherwise, the DSP 18 continues to monitor and forward decoded information detected on the channel.

At the end of the dialed digits, the PSTN 14 may forward a R2 MFC make call instruction. The DSP 18 upon detecting and decoding the received instruction forwards the instruction and detects a response character stored with the received instruction. The DSP 18 requests channel access and returns the R2 MFC response.

Upon receipt of the make call instruction, the processor may forward the call record as a call packet or otherwise to the CPE switch 28 for processing. In response, the CPE switch 28 may return a connecting and ringback indication.

The processor 16 upon receiving the connecting and ringback indication may forward such information to the DSP 18. The DSP 18 in turn may retrieve equivalent R2 MFC indications from memory and forward such indications on the corresponding outbound calling channel.

When the call is answered, the CPE switch 28 similarly forwards a connect notification to the processor 16. The processor 16 forwards the connect notification to the DSP 18 which, in turn, retrieves an equivalent R2 MFC notification which may then be transmitted through the MUX 23 on the calling channel to the PSTN 14.

A similar process may be used where an agent (not shown) of the CPE switch 28 were to wish to make a call. For instance, a make call instruction, along with a set of dialed digits, may be transferred from the CPE switch 28 to the processor 16. The processor transfers the instruction to the DSP 18 which converts the make call instruction to an equivalent R2 MFC instruction which may then be transferred to the PSTN 14.

In an equivalent manner to the PSTN 14, the DSP 14 now waits for an acknowledgement of the make call message from the PSTN 14 before forwarding a set of R2 MFC dialed digits. Upon receiving the acknowledgement, the DSP 18 forwards the dialed digits.

Upon receiving a call connect, the DSP 18 notifies the processor 16 which then forwards the call connect message to the CPE switch 28. Following the call connect, the PSTN 14 and CPE switch 28 connect calling and called parties and a conversation may ensue.

A specific embodiment of a method and apparatus for processing R2 MFC signals according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of processing and converting a protocol of control transmissions exchanged between a controller of a telephone switch located within a user's customer premises equipment and- a plurality of external trunk connections where at least some of the plurality of external trunk connections operate under R2 multifrequency compelled signaling and other trunk channels of the external trunk connections do not operate under R2 multifrequency compelled signaling, such method comprising the steps of:

disposing a digital signal processor within the user's customer premises equipment for performing the protocol conversions;

detecting R2 multifrequency compelled signaling control transmissions by the digital signal processor on a subscriber channel of the at least some external trunk connections that operate under R2 multifrequency compelled signaling;

responding, when necessary, to a control transmission of the detected control transmissions within the digital signal processor by transmitting an acknowledgement on an outbound path of the subscriber channel of the at least some external trunk connections;

converting the protocol of the control transmissions received from the subscriber channel and the controller of the telephone switch; and transferring the protocol converted control transmissions between the digital signal processor and the outbound path of the subscriber channel and between the digital signal processor and the controlling processor of the switch.

2. The method of processing signals as in claim 1 wherein the step of responding to the control transmissions on the outbound path further comprises transmitting R2 multifrequency compelled signaling control responses.

3. The method of processing signals as in claim 1 wherein the step of detecting the R2 multifrequency compelled signaling control transmissions further comprises fast fourier transforming the detected transmissions to provide a set of signal elements.

4. The method of processing signals as in claim 3 wherein the step of detecting the R2 multifrequency compelled signaling control transmissions further comprises narrowing the signal elements provided by the fast fourier transform to those elements exceeding a threshold.

5. The method of processing signals as in claim 1 wherein the step of responding to the control transmission by the digital signal processor on the outbound path further comprises disposing a multiplexer in the outbound path of the switch.

6. The method of processing signals as in claim 5, wherein the step of responding to the control transmission by the digital signal processor on the outbound path further comprises selecting the digital signal processor as a signal source for transmission on the outbound channel through the multiplexer.

7. The method of processing signals as in claim 1 wherein the step of transferring the protocol converted control transmission to the controlling processor of the switch further comprises interpreting the representation as a call set up message.

8. The method of processing signals as in claim 1 wherein the step of transferring the protocol converted control transmission to the controlling processor of the switch further comprises interpreting the representation as a dialed digit.

9. The method of processing signals as in claim 1 further comprising transferring a channel setup message from the processor of the switch to the digital signal processor.

10. The method of translating signals as in claim 9 wherein the step of transferring a channel setup control message from the processor of the switch to the digital signal processor further comprises retrieving a pulse sequence corresponding to the command from a memory of the digital signal processor.

11. The method of translating signals as in claim 10 wherein the step of retrieving a pulse sequence corresponding to the command from a memory of the digital signal processor further comprises transmitting the pulse sequence to the outbound channel.

12. A method of processing and performing protocol conversion of signals received on a R2 multifrequency compelled signaling subscriber channel within a user's customer premises equipment that includes a telephone switch, such method comprising the steps of:
    disposing a digital signal processor within the user's customer premises equipment between an inbound path of the R2 multifrequency compelled signal subscriber channel and a controlling processor of the telephone switch;
    detecting an R2 multifrequency compelled signaling control transmission by the digital signal processor on the inbound path;
    fast fourier transforming the detected transmission to provide a set of signal elements;
    narrowing the signal elements provided by the fast fourier transform to those elements exceeding a threshold;
    comparing the narrowed elements to a set of known signaling elements to determine a meaning of the control transmission;
    responding to the control transmission within the digital signal processor by transmitting an acknowledgement on an outbound path of the subscriber channel; and
    transferring a symbolic representation of the control transmission to the controlling processor of the switch.

13. The method of processing signals as in claim 12 wherein the step of determining the meaning of the control transmission further comprises retrieving a control response stored in conjunction with the determined control transmission.

14. The method of processing signals as in claim 13 wherein the step of responding to the control transmission further comprises converting the control response to a R2 multifrequency compelled signaling format.

15. The method of processing signals as in claim 14 wherein the step of converting the control response to the R2 multifrequency compelled signaling format further comprises retrieving a pulse sequence from a lookup table in a memory of the digital signal processor.

16. Apparatus for processing and converting a protocol of control transmissions exchanged between a controller of a telephone switch located within a user's customer premises equipment and a plurality of external trunk connections where at least some of the external trunk connections operate under R2 multifrequency compelled signaling and others do not operate under R2 multifrequency compelled signaling, such apparatus comprising:
    a digital signal processor adapted to perform the protocol conversions disposed within the user's customer premises equipment;
    means within the digital signal processor for detecting R2 multifrequency compelled signaling control transmissions on a subscriber channel of the at least some of the external trunk connections that operate under R2 multifrequency compelled signaling;
    means within the digital signal processor for responding, when necessary, to a control transmission of the detected control transmissions by transmitting an acknowledgement on an outbound path of the subscriber channel of the at least some external trunk connections; and
    means for transferring protocol converted control transmissions converted within the digital signal processor between the subscriber channel and the controlling processor of the switch.

17. The apparatus for processing signals as in claim 16 wherein the means for responding to the control transmissions on the outbound path further comprises means for transmitting R2 multifrequency compelled signaling control responses.

18. The apparatus for processing signals as in claim 16 wherein the means for detecting the R2 multifrequency compelled signaling control transmissions further comprises means for fast fourier transforming the detected transmissions to provide a set of signal elements.

19. The apparatus for processing signals as in claim 18 wherein the means for detecting the R2 multifrequency compelled signaling control transmissions further comprises means for narrowing the signal elements provided by the fast fourier transform to those elements exceeding a threshold.

20. The apparatus for processing signals as in claim 16 wherein the means for responding to the control transmission by the digital signal processor on the outbound path further comprises means for disposing a multiplexer in the outbound path of the switch.

21. The apparatus for processing signals as in claim 20 wherein the means for responding to the control transmission by the digital signal processor on the outbound path further comprises means for selecting the digital signal processor as a signal source for transmission on the outbound channel through the multiplexer.

22. The apparatus for processing signals as in claim 16 wherein the means for transferring the protocol converted control transmission to the controlling processor of the switch further comprises means for interpreting the representation as a call set up message.

23. The apparatus for processing signals as in claim 16 wherein the means for transferring the protocol converted control transmission to the controlling processor of the switch further comprises means for interpreting the representation as a dialed digit.

24. The apparatus for processing signals as in claim 16 further comprising means for transferring a channel setup message from the processor of the switch to the digital signal processor.

25. The apparatus for translating signals as in claim 24 wherein the means for transferring a channel setup control message from the processor of the switch to the digital signal processor further comprises means for retrieving a pulse sequence corresponding to the command from a memory of the digital signal processor.

26. The apparatus for translating signals as in claim 25 wherein the means for retrieving a pulse sequence corresponding to the command from a memory of the digital signal processor further comprises means for transmitting the pulse sequence to the outbound channel.

27. Apparatus for processing and performing protocol conversion of signals received on a R2 multifrequency compelled signaling subscriber channel within a user's customer premises equipment that includes a telephone switch, such apparatus comprising:

a digital signal processor disposed within the user's customer premises equipment between an inbound path of the R2 multifrequency compelled signal subscriber channel and a controlling processor of the telephone switch;

means for detecting an R2 multifrequency compelled signaling control transmission by the digital signal processor on the inbound path;

means for fast fourier transforming the detected control transmission to provide a set of signal elements;

means for narrowing the signal elements provided by the fast fourier transform to those elements exceeding a threshold;

means for comparing the narrowed elements to a set of known signaling elements to determine a meaning of the control transmission;

means within the digital signal processor for responding to the control transmission by transmitting an acknowledgement on an outbound path of the subscriber channel; and means for transferring a symbolic representation of the control transmission to the controlling processor of the switch.

28. The apparatus for processing signals as in claim 27 wherein the means for determining the meaning of the control transmission further comprises means for retrieving a control response stored in conjunction with the determined control transmission.

29. The apparatus for processing signals as in claim 28, wherein the means for responding to the control transmission further comprises means for converting the control response to a R2 multifrequency compelled signaling format.

30. The apparatus for processing signals as in claim 29 wherein the means for converting the control response to the R2 multifrequency compelled signaling format further comprises means for retrieving a pulse sequence from a lookup table in a memory of the digital signal processor.

31. Apparatus for processing and performing protocol conversion between a controller of a telephone switch located within a user's customer premises equipment and a plurality of external trunk connections where at least some but not all of the plurality of external trunk connections operate under R2 multifrequency compelled signaling, such apparatus comprising:

a digital signal processor disposed within the user's customer premises equipment for performing protocol conversions;

a frequency detector within the digital signal processor which detects an R2 multifrequency compelled signaling control transmission on a subscriber channel of the at least some but not all trunk connections of the plurality of external trunk connections that operates under R2 multifrequency compelled signaling;

a multifrequency generator within the digital signal processor which responds, when necessary, to the control transmission by transmitting an acknowledgement on an outbound path of the subscriber channel of the at least some but not all trunk connections of the plurality of external trunk connections; and a communication interconnect operatively coupled to the digital signal processor and adapted to transfer protocol converted control transmissions between the digital signal processor and the controlling processor of the switch and between the digital signal processor and the subscriber channel.

32. The apparatus for processing signals received on a R2 multifrequency compelled signaling subscriber channel as in claim 31 wherein the frequency detector further comprises a fast fourier transform utility operating within the digital signal processor.

33. The apparatus for proceeding signals received on a R2 multifrequency compelled signalling subscriber channel as in claim 31 wherein the multifrequency generator further comprises a lookup table.

* * * * *